(12) United States Patent
Schultz et al.

(10) Patent No.: US 12,073,420 B2
(45) Date of Patent: *Aug. 27, 2024

(54) AGGREGATION AND USE OF INFORMATION RELATING TO A USER'S CONTEXT FOR PERSONALIZED ADVERTISEMENTS

(71) Applicant: Verizon Patent and Licensing Inc., Arlington, VA (US)

(72) Inventors: Paul T. Schultz, Colorado Springs, CO (US); Robert A. Sartini, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1234 days.

This patent is subject to a terminal disclaimer.

(21) Appl. No.: 16/669,795

(22) Filed: Oct. 31, 2019

(65) Prior Publication Data
US 2020/0065830 A1 Feb. 27, 2020

Related U.S. Application Data

(63) Continuation of application No. 12/400,566, filed on Mar. 9, 2009, now Pat. No. 10,504,124, which is a continuation-in-part of application No. 12/106,444, filed on Apr. 21, 2008, now abandoned.

(51) Int. Cl.
| | | |
|---|---|---|
| G06Q 30/00 | (2023.01) | |
| G06F 16/245 | (2019.01) | |
| G06Q 30/02 | (2023.01) | |
| G06Q 30/0251 | (2023.01) | |
| G05B 19/418 | (2006.01) | |

(52) U.S. Cl.
CPC .......... *G06Q 30/02* (2013.01); *G06F 16/245* (2019.01); *G06Q 30/0255* (2013.01); *G06Q 30/0261* (2013.01)

(58) Field of Classification Search
CPC .............. G06Q 30/02; G06Q 30/0255; G06Q 30/0261; G06F 16/245
See application file for complete search history.

(56) References Cited

U.S. PATENT DOCUMENTS

| | | | |
|---|---|---|---|
| 6,912,398 B1 | 6/2005 | Domnitz | |
| 7,072,956 B2 | 7/2006 | Parupudi et al. | |
| 7,580,005 B1 * | 8/2009 | Palin ................ | H04M 1/72412 345/2.1 |
| 7,930,211 B2 | 4/2011 | Crolley | |
| 8,160,615 B1 * | 4/2012 | Barnes ................ | H04W 4/023 455/456.2 |

(Continued)

OTHER PUBLICATIONS

"Context Awareness: a Practitioner's Perspective". IEEE. 2005 (Year: 2005).*

(Continued)

*Primary Examiner* — Maria V Vanderhorst

(57) ABSTRACT

Information, called context information, relating to a current state of a user may be aggregated. In one implementation, the context information may include information that is automatically generated by communication devices of the user and information, submitted by the user, that relates to the user's state. The context information may be used to provide personalized advertisements for the user.

20 Claims, 11 Drawing Sheets

(56) References Cited

U.S. PATENT DOCUMENTS

| | | | |
|---|---|---|---|
| 8,200,691 | B2 | 6/2012 | Xu et al. |
| 8,326,630 | B2 | 12/2012 | Chandrasekar et al. |
| 8,489,599 | B2 | 7/2013 | Bellotti |
| 8,745,228 | B2 | 6/2014 | Beckert et al. |
| 10,311,446 | B2 | 6/2019 | Prehofer et al. |
| 2002/0111919 | A1 | 8/2002 | Weller et al. |
| 2004/0032393 | A1* | 2/2004 | Brandenberg ...... G06F 16/9535 707/E17.11 |
| 2004/0259573 | A1 | 12/2004 | Cheng |
| 2005/0120221 | A1 | 6/2005 | Arnold et al. |
| 2006/0080435 | A1 | 4/2006 | Tankov et al. |
| 2006/0288099 | A1 | 12/2006 | Jefferson et al. |
| 2007/0110010 | A1* | 5/2007 | Kotola .................. H04W 4/80 370/338 |
| 2007/0165554 | A1 | 7/2007 | Jefferson et al. |
| 2007/0205278 | A1 | 9/2007 | Lovett |
| 2007/0282990 | A1 | 12/2007 | Kumar et al. |
| 2008/0098420 | A1 | 4/2008 | Khivesara et al. |
| 2008/0305778 | A1 | 12/2008 | Aaltonen et al. |
| 2009/0006180 | A1 | 1/2009 | Hameen-Anttila |
| 2009/0030780 | A1 | 1/2009 | York et al. |
| 2009/0119164 | A1 | 5/2009 | Colson et al. |
| 2010/0106263 | A1 | 4/2010 | Charania |
| 2010/0161720 | A1 | 6/2010 | Colligan et al. |
| 2010/0241495 | A1 | 9/2010 | Maniyar et al. |
| 2010/0257065 | A1 | 10/2010 | Gupta et al. |
| 2011/0004754 | A1 | 1/2011 | Walker et al. |
| 2014/0129332 | A1 | 5/2014 | Ramer et al. |

OTHER PUBLICATIONS

"Script-based approach to distributed presence aggregation". IEEE. 2005. (Year: 2005).*

Bergmann O., et al., "A Script-based Approach to Distributed Presence Aggregation," International Conference on Wireless Networks, Communications and Mobile Computing, IEEE 2005, pp. 1168-1174.

Kim C.K., et al., "A Design of Home Subscriber Server for IP Multimedia Service in All-IP UMTS Network," 14th IEEE Personal, Indoor and Mobile Radio Communications (PIMRC 2003), Sep. 7-10, 2003, vol. 3, pp. 2073-2077.

* cited by examiner

AGGREGATION AND USE OF INFORMATION RELATING TO A USER'S CONTEXT FOR PERSONALIZED ADVERTISEMENTS

RELATED APPLICATIONS

This application is a continuation of U.S. patent application Ser. No. 12/400,566, filed Mar. 9, 2009, entitled "AGGREGATION AND USE OF INFORMATION RELATING TO A USER'S CONTEXT," which claims priority from and is a continuation-in-part (CIP) of U.S. patent application Ser. No. 12/106,444, filed Apr. 21, 2008, entitled "AGGREGATION AND USE OF INFORMATION RELATING TO A USER'S CONTEXT," the disclosures of which are incorporated herein by reference.

BACKGROUND INFORMATION

Modern telecommunication networks can provide a number of different types of services to users. For example, a user may, at any particular time, be communicating using a portable telephone, watching television using a set-top box, or interacting with a personal computer. Further, the user may be physically present in any number of different locations (i.e., the user may be at home, at work, or someplace else).

The on/off state of a user's communication devices, the physical location of the user, the user's presence and availability via various devices, and possibly other information relating to the user's state, such as user preferences, may be useful to other people or businesses with whom the user interacts.

DETAILED DESCRIPTION OF PREFERRED EMBODIMENTS

The following detailed description of exemplary implementations refers to the accompanying drawings. The same reference numbers in different drawings may identify the same or similar elements. Also, the following detailed description does not limit the invention.

Implementations described herein may provide for systems that aggregate information relating to a state, called user "context information" or "context" herein, corresponding to a user. The aggregated context may be accessed by other users or businesses to potentially enable a number of possible services for the user. In some implementations, the ability or extent of others to access a user's context can be controlled by the user. Also, in some implementations, context may be leveraged to provide context-based authentication for a wide variety of transactions.

In one particular implementation, context and user preferences may be used to provide personalized advertisements to the user. The advertisements may, for instance, be optimized based on one or more of the device currently being used by the user, user location, user preferences, or user state information.

Figure 1:
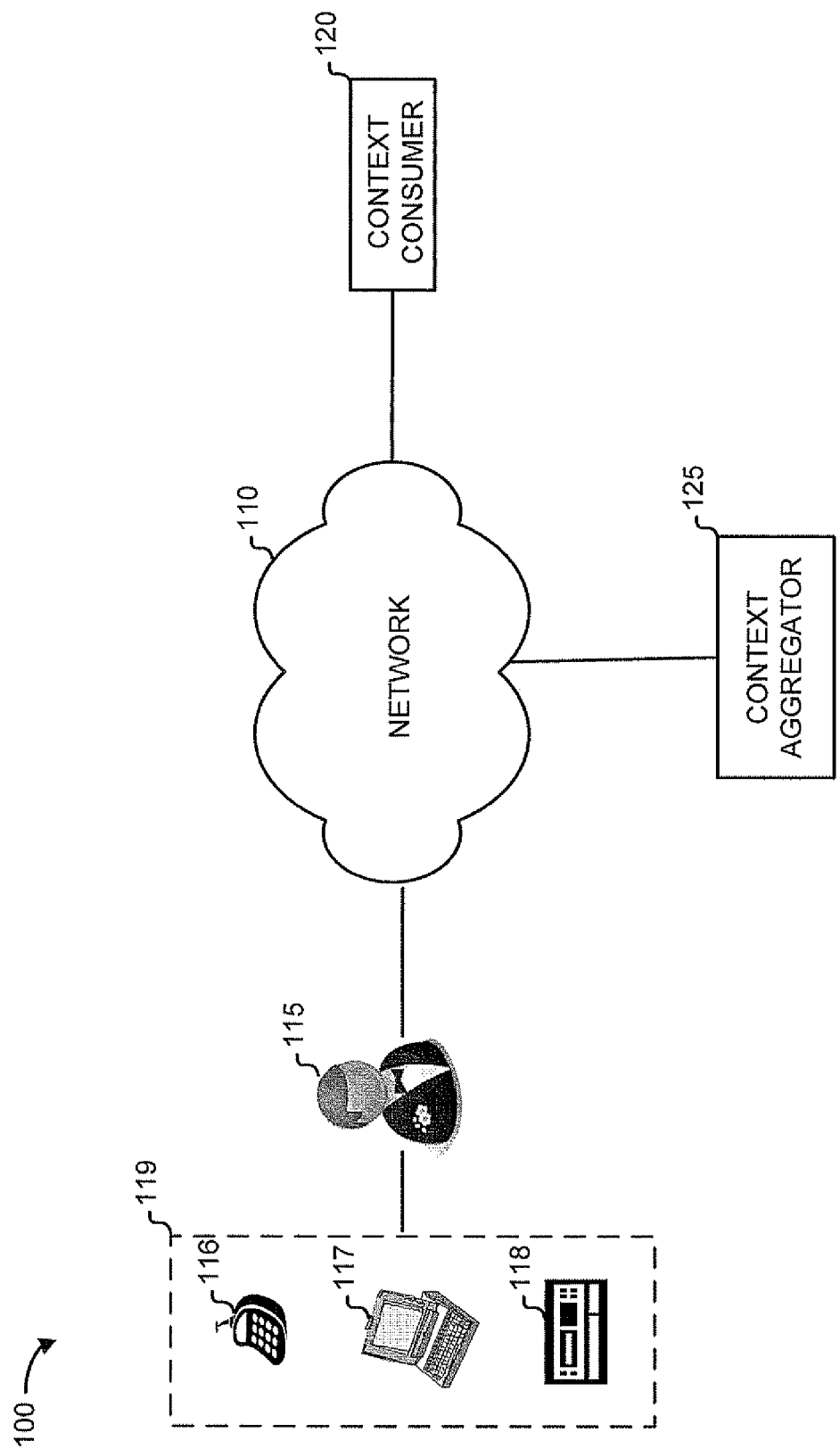
FIG. 1 is a diagram illustrating an exemplary system in which concepts described herein may be implemented.

FIG. 1 is a diagram illustrating an exemplary system 100 in which concepts described herein may be implemented. As shown, system 100 includes a network 110, a user 115, a context consumer 120, and a context aggregator 125.

Network 110 may generally include one or more networks that provide telephony or data services to user 115, content consumer 120, or context aggregator 125. Network 110 may include one or more networks of any type, including a Public Land Mobile Network (PLMN), a Public Switched Telephone Network (PSTN), a cellular network, a VOIP network, a metropolitan area network (MAN), a wide area network (WAN), a local area network (LAN), a private network, the Internet, an intranet, and/or another type of network. Network 110 may particularly represent a number of different types of networks, such as a cellular network, a PSTN, and/or a wide area data network (e.g., the Internet). In this situation, network 110 may also include gateway devices that provide interfaces between different network types.

User 115 may represent a person using telecommunication services provided through network 110. User 115 may interact with network 110 using one or more of a number of client devices, such as a telephone device 116, a personal computer 117, or a television set-top box 118 (collectively referred to as devices 119). Telephone device 116 may generally include any type of telephone device, such as a cellular or other mobile phone, a VoIP phone, or a personal digital assistant (PDA) or other type of smart phone. Telephone device 116 may generally be referred to herein as a mobile telephone device (mobile phone) 116. Personal computer 117 may generally include any type of computing device, such as a personal computer or laptop computer. Set-top box 118 may include set-top boxes designed to connect a user's television to television content delivered via coaxial cable, fiber optic cable, or over the air. The functions of set-top box 118 may potentially be integrated within a television or computing device.

Context consumer 120 may represent one or more devices that, in some way, use ("consume") context information for user 115. Context information, as used herein, refers to information relating to the state of user 115 and/or devices 119. Context information may include, for example, presence and availability information (e.g., the on/off state of devices 119, online/offline, busy, away, available, DoNotDisturb, etc.), capability information relating to devices 119 (e.g., bandwidth, the services available on the device, etc.), the physical location of the user (at home, at work, etc.), status information provided by a user via one or more of devices 119, and preference information of the user. Context information and sources for context information will be described in more detail below with reference to FIG. 3.

Context consumer 120 may represent one or more computing devices. For example, context consumer 120 may be a server device, such as a web server, that uses context information to generate personalized web pages for user 115. As another example, context consumer 120 may be a client device, such as one of devices 119, that is being used by another user that is interacting with user 115.

Context aggregator 125 may keep track of context information for users. Context aggregator 125 may additionally provide context information to context consumers 120, e.g., via network 110. Context aggregator 125 may represent one or more computing devices. The functionality associated with context aggregator 125 will be described in more detail below.

The number of networks 110, users 115, context consumers 120, and context aggregators 125 illustrated in FIG. 1 is provided for simplicity. In practice, there may be more networks 110, users 115, context consumers 120, and context aggregators 125.

Figure 2:
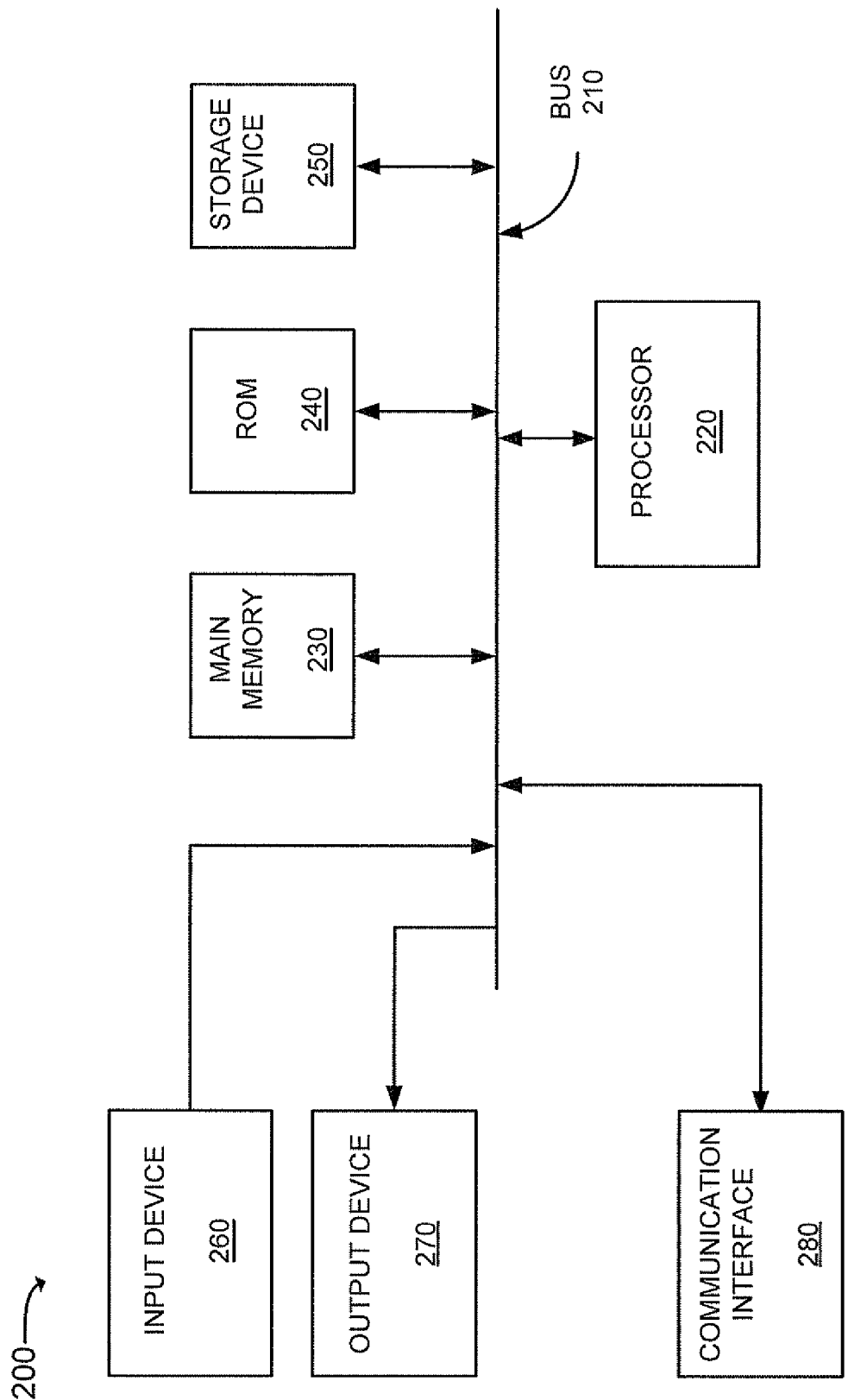
FIG. 2 is a diagram of an exemplary computing device used to implement elements shown in FIG. 1.

FIG. 2 is a diagram of an exemplary computing device 200, such as one of devices 119, a computing device used to implement context consumer 120, or a computing device used to implement context aggregator 125. Computing device 200 may include a bus 210, a processor 220, a main memory 230, a read only memory (ROM) 240, a storage device 250, an input device 260, an output device 270, and a communication interface 280. Bus 210 may include conductors or a pathway that permit communication among the components of computing device 200.

Processor 220 may include a processor(s), a microprocessor(s), or processing logic that interprets and executes instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include one or more mechanisms that permit a user to input information to computing device 200, such as a keyboard, a mouse, a pen, voice recognition and/or biometric mechanisms, etc. Output device 270 may include one or more mechanisms that output information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 110.

As will be described in detail below, context aggregator 125 may aggregate and provide access to context information from multiple users 115. Additionally, users 115 and context consumers 120 may send context information to context aggregator 125 or access context information through context aggregator 125. Software implementing these functions may be stored in a computer-readable medium, such as memory 230. A computer-readable medium may be defined as one or more physical or logical memory devices.

The software instructions defining the operations of computing device 200 may be read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes described herein. Thus, embodiments described herein are not limited to any specific combination of hardware circuitry and software.

Figure 3:
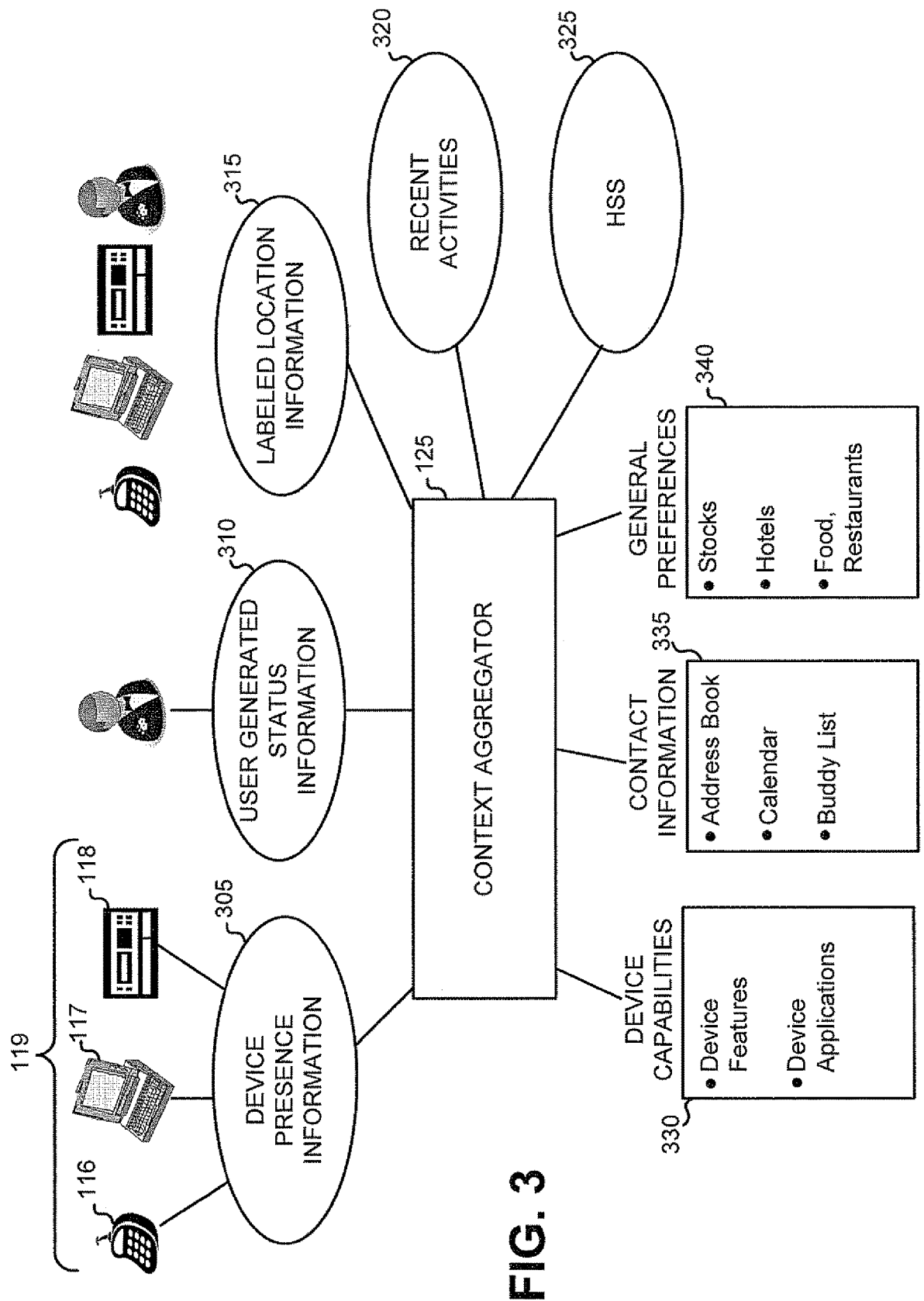
FIG. 3 is a diagram illustrating exemplary types of information that may be received and stored to define a user's context.

The context for a user, as previously mentioned, may be generally defined as the state of that user. Context information may be stored and maintained by context aggregator 125. A user's current context may be defined based on information drawn from a number of different sources. FIG. 3 is a diagram illustrating exemplary types of information that may be received and stored by context aggregator 125 to thereby define a user's context.

Device presence information 305 may be used to define a user's context. Device presence information may include any information automatically generated by devices 119 that are associated with the user. As shown in FIG. 3, devices that may generate presence information can include telephone device 116, personal computer 117, or television set-top box 118. Other devices may also generate presence information.

One example of device presence information may include the current state of a device, such as whether the device is on or off. Many networked devices, such as portable phones, VoIP phones, and set-top boxes may register or otherwise inform, via network 110, the service provider for the device when the device is turned on. For these devices, the presence information for the device may be automatically updated in context aggregator 125 as the device changes state. Other devices, such as personal computers, may be configured to update their presence information with context aggregator 125. For example, an instant messaging application or other application installed on personal computer 117 may apprise context aggregator 125 of whether user 115 is currently using the computer.

Another example of automatically generated presence information may include the location of the device. Telephone device 116, for instance, may include a global positioning system (GPS) unit that allows the device to determine its geographical location. Telephone device 116 may transmit this information to context aggregator 125 as part of its presence information.

User generated status information 310 may also be used to define a user's context. User generated status information 310 may include information generated by the user that relates to the user's status or state. User 115 may submit user generated status information 310 to context aggregator 125 using devices such as devices 119. For example, telephone device 116 may include an application that allows the user to send a text message to context aggregator 125 that indicates the user's current activity. For instance, the user may indicate that his current activity is "sleeping," "in a meeting," "working out," "cooking," "do-not-disturb", etc. As another example, the user may enter current status information at a web site provided by context aggregator 125, through interaction with set-top box 118, or via an application executing at personal computer 117. The activities that the user can choose from may be customized by the user or pre-set by the provider of context aggregator 125.

Labeled location information 315 may also be used to define a user's context. Labeled location information 315 may include labels that symbolically define the location of the user. Such labels may include "work," "home," "school,"

etc. that provide an indication of the user's location. Although labeled location information 315 is shown as a separate element in FIG. 3, labeled location information 315 may be automatically generated by devices 119 as presence information (e.g., GPS data sent to context aggregator 125 by the devices) or as information that is part of user generated status information 310. For example, the user may explicitly send a message to context aggregator 125 indicating that his location is "work."

Labeled location information 315 may also be generated using other techniques. For example, location labels may be generated based on user-defined rules relating to device presence information. For instance, the user may indicate that whenever he is logged into his home computer, his location label should be set to "home." As another example, context aggregator 125 may infer a label appropriate for the user's current location based on geographical location information. For example, the geographic coordinates of the user's home (i.e., latitude and longitude coordinates) may be used to infer that the user is at home whenever telephone device 116 indicates it is at a geographic location corresponding to the coordinates of the user's home. As yet another example, labeled location information 315 may be set based on information taken from calendar information shared by the user. It can be appreciated that these examples of the generation of labeled location information are exemplary only and that numerous other rules or techniques could be used by context aggregator 125 to generate labeled location information 315.

Recent activities information 320 may also be collected and used by context aggregator 125 to define a user's context. Recent activity information 320 may include information relating to the user's activities. For instance, recent telephone numbers called, web searches, and stock quote requests may all be relevant to the user's current context.

Home subscriber service (HSS) 325 may also be used as a source of information for context aggregator 125. As is known in the art, HSS may refer to systems used to support IP Multimedia Subsystems (IMS). HSS 325 may contain user and service profiles, potentially including the geographical location of a user, that are used to support the handling of calls and sessions. The user profiles and user location information that is known by HSS 325 may be transmitted to or otherwise used by context aggregator 125.

Context aggregator 125 may use additional information when maintaining a user's context. As shown in FIG. 3, this information may include device capabilities 330, contact information 335, and general preferences information 340. Information 330, 335, and 340 may be obtained in a variety of ways, such as by the user explicitly setting this information via a graphical interface (e.g., a web interface).

Device capabilities 330 may include information relating to the devices, such as devices 119, that are typically used by the user. Device capabilities 330 may be provided by the user or known in advance by context aggregator 125, such as if context aggregator provided one or more of devices 119 to a user as part of a service contract. Device capabilities may also be provided by the device itself. Device capabilities 330 may generally include any information describing devices 119 that may be relevant to context aggregator 125. For example, device capabilities information 330 may include features of a device (e.g., whether a mobile phone includes GPS capability, bandwidth of the device, video capability of the device, etc.), applications installed on a device (e.g., a personal computer may be running an instant messaging application designed to work with context aggregator 125), and a list of devices 119 that are possessed by the user.

Contact information 335 may include information relating to contact or calendar data of the user. For example, context aggregator 125 may maintain a copy of the user's calendar(s), address book(s), or instant messaging "buddy" or "friends" lists. Such information may be useful in inferring the user's current state or in determining which other users are allowed to access a user's context.

General preferences 340 may include any information relating to user preferences. For example, stocks the user is interested in watching, hotels the user prefers to stay at, and restaurants the user prefers may all be stored as part of preferences information 340.

As previously discussed, context aggregator 125 may gather and maintain information relating to a user's context in a number of ways. For example, information relating to a user's context may be explicitly submitted by a user, gathered automatically from user devices 119, inferred from user activity and/or predefined rules, or gathered from external information sources. At any particular point in time, the most recent set of gathered information for a user may define the user's "current" context.

Figure 4:
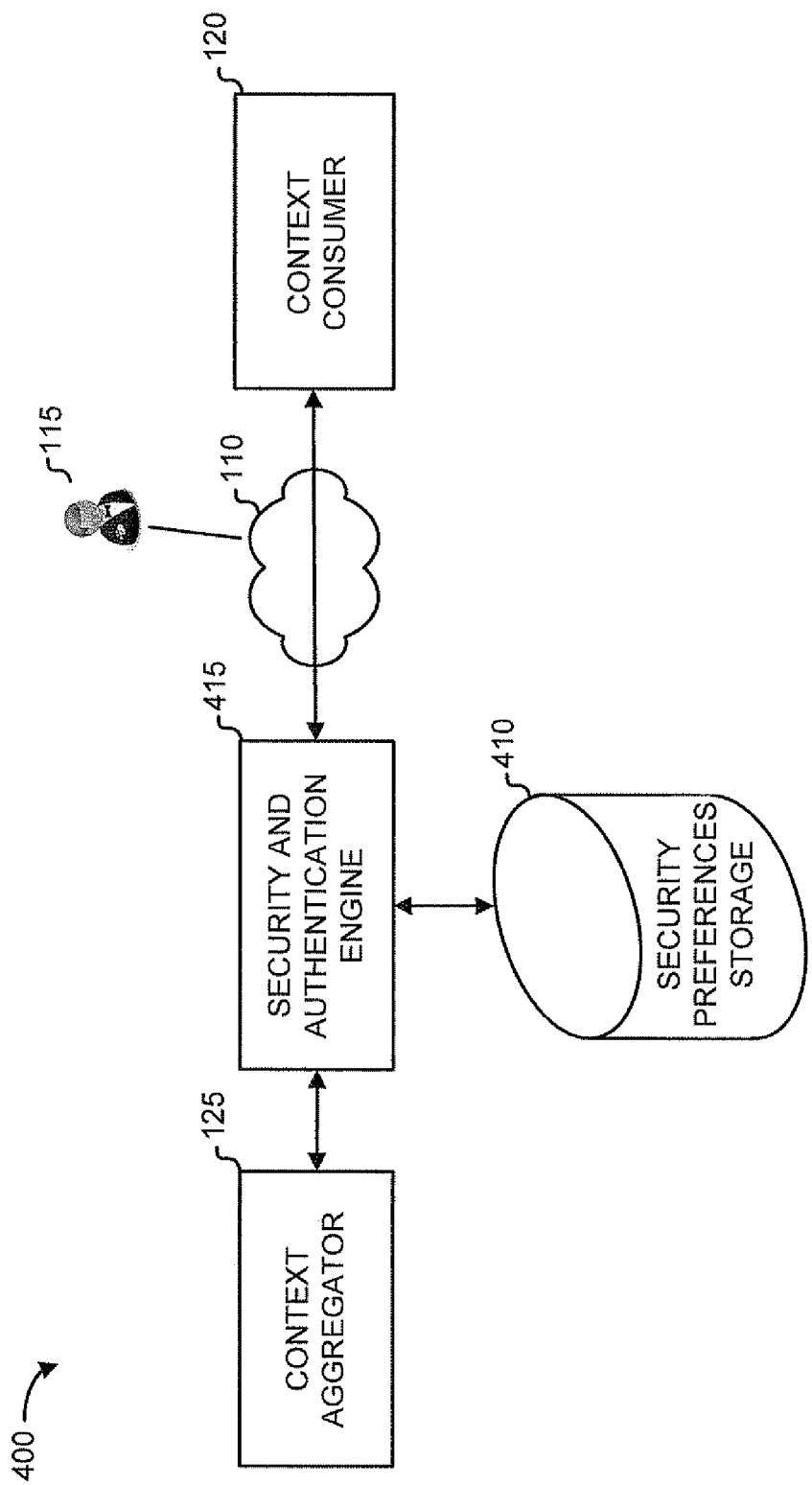
FIG. 4 is a diagram of an exemplary system for using context information collected by a context aggregator.

FIG. 4 is a diagram of an exemplary system 400 for using context information collected by context aggregator 125. System 400 is similar to system 100, except that in system 400, two additional components are shown: security preferences storage 410 and security and authentication engine 415. Security preferences storage 410 and security and authentication engine 415 may function to limit access to context aggregator 125 by content consumer 120. Limiting access to a user's context to authorized entities can be important to protect the user's privacy and personal information.

Security preferences storage 410 may include a database or other storage structure that stores information relating to who or what may access a user's context information. Security preferences storage 410 may, for example, store an "allow list" that only permits certain people or certain businesses to access the user's context information. Additionally, different entities on the allow list may be given a different scope of access rights. For example, a user may configure security preferences storage 410 so that family members are given full access to the user's context while friends are only allowed to access certain fields of the user's context.

The security preferences information maintained in storage 410 may be set or configured by the user in a number of ways. For example, the operator of context aggregator 125 may permit a user to change their security information via a web interface or through another interface, such as one provided through devices 119.

Security and authentication engine 415 may handle, based on user security preferences from security preferences storage 410, securing of the user context information in context aggregator 125. In other words, security and authentication engine 415 may receive requests for user content from context consumers 120 and determine whether the request should be fulfilled.

Figure 5:
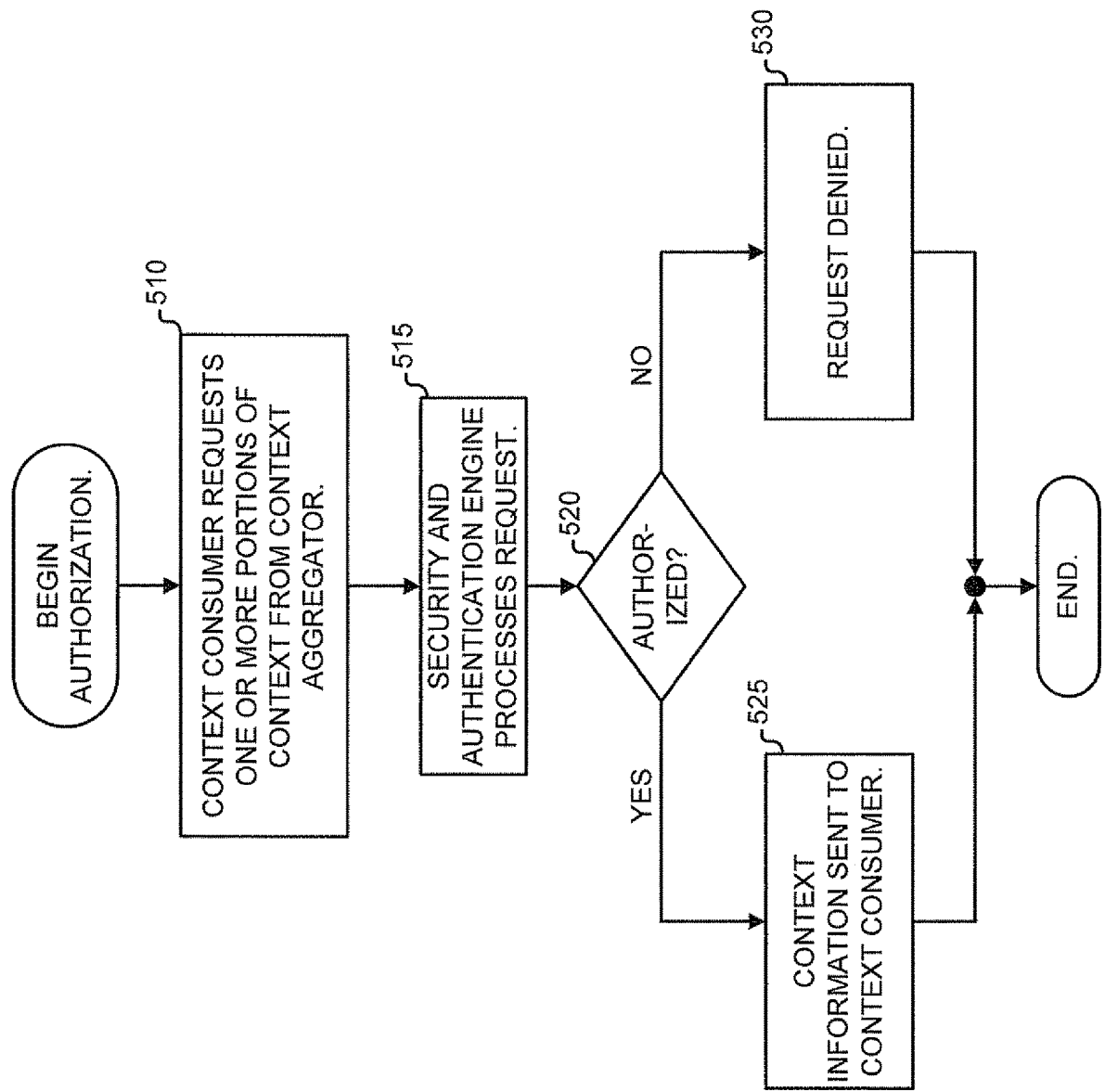
FIG. 5 is a flow chart illustrating exemplary operations for accessing and using a user's context by a context consumer.

FIG. 5 is a flow chart illustrating exemplary operations for accessing and using a user's context by a context consumer.

To begin, assume context consumer 120 would like to access a user's context. Context consumer 120 may be, for example, an acquaintance of the user, the employer of the user, or an entity that has a business relationship with the user. Context consumer 120 may request one or more portions of context from context aggregator 125 (block 510). For example, a friend may request the user's current location and activity; a business, such as a pizza delivery service, may request which toppings the user prefers on a pizza; etc.

In response to the request, security and authentication engine 415 may determine whether the requesting context consumer 120 has authority to make the request (block 515). This determination may include authenticating the requesting entity and then comparing the requesting entity to the security settings, as stored in security preferences storage 410.

If the request is accepted (block 520), the requested context may be sent to the context consumer (block 525). Otherwise, the request may be denied (block 530).

To further illustrate applications of the operations illustrated in FIG. 5, a number of examples of the use of user context will now be given.

Consider a customer that wishes to order pizza from a pizza deliver restaurant. The customer and restaurant may use the consumer's context to improve the pizza delivery experience. For example, instead of calling the restaurant, providing the consumer's name, delivery address, and pizza order, the customer may simply call or text message the restaurant with an order such as "bring me my usual." The call or message may also include information, such as the customer's phone number, that allows the restaurant to identify the customer.

The restaurant may query context aggregator 125 to get the information needed to satisfy the customer's order. For instance, the customer may have configured general preferences information 340 in context aggregator 125 to include an entry listing the toppings for the customer's "usual" or favorite pizza toppings. Further, context aggregator 125 may also provide the restaurant with the customer's current location, thus allowing the restaurant to deliver the pizza to the address at which the customer is currently residing.

The restaurant's query to context aggregator 125 may be subject to security restrictions imposed by security and authentication engine 415. For instance, the customer may have previously indicated that the particular pizza restaurant is to be given access to information of the user's context relating to the customer's current location and pizza topping preferences. Alternatively, the customer may have indicated that any restaurant in an approved network of restaurants should be given access to the customer's current location and food preferences. Requests for context information outside the scope of the customer's security settings may be rejected.

As another example of the use of user context, consider the sharing of context with friends. Assume people on a user's list of approved friends are given permission to view device presence information 305 and user generated status information 310. These friends may then be able to view, for example, the television show the user is currently watching, the communication devices available to the user, and the presence state of these devices. Thus, if a friend sees that the user's home phone is "busy," the user's mobile phone is off, but the user is logged into an instant messaging (IM) application, the friend will know that the best way to reach the user is via IM.

The user may configure security restrictions imposed by security and authentication engine 415 to give the user's boss or business associate a different view of the user. For example, the user's boss may only be allowed to view presence information relating to the status of the user's mobile phone and only be allowed to view certain labeled location information that relates to work, such as "at my desk," "in a meeting," "traveling," etc.

As another example of the use of user context, consider the use of context by a user to capture information that the user may later need. For example, assume a user is viewing a streaming media presentation on a portable device. The user may need to disconnect during the middle of the presentation. Later, the user may desire to resume the presentation at the point at which the user disconnected. In this situation, the user may have saved or context aggregator 125 may have automatically saved the user's position in the presentation, thus allowing the user to easily restart the presentation at the desired location.

As another example of the use of user context, consider the use of context to adapt a communication request to one that is most appropriate for the user's current situation. For example, the user may be in a library and may consequently set the user context to indicate "quiet." When a friend attempts to initiate a multimedia communications session with the user, the user's context may be used to determine the communication channel. For instance, the telecommunication service provider for the friend's communication request may first consult context aggregator 125. In response, the telecommunication service provider may notify the friend that the user's current status is "quiet" and that the multimedia communication request cannot be completed. When the user's status becomes available, the telecommunication service provider may automatically attempt to set up the multimedia communication request. Alternatively, instead of delaying the communication request, the user's "quiet" device status may result in the communication request being automatically initiated as a "quiet" compatible communication session. For example, the user's mobile phone may be automatically set to ring in vibrate mode and an IM session may be set up between the two parties.

As yet another example of the user of user context, consider the use of a user's context to provide the richest possible delivery of multimedia content. For example, if a user requests content, the content provider may deliver a content stream that is optimized for the highest resolution device that is currently available to the user based on the user's location and based on a list of devices associated with the user. Further, the content delivery may be adapted in real-time based on the user's context. Accordingly, if a user's context is updated to indicate a better device is available, the content stream may be switched to the newly available device.

In one implementation, access to a user's security settings in security preferences storage 410 may be given to a parent or supervisor to thereby create a "parental control" feature. Accordingly, a parent may control access to their child's context, including location, presence information, preferences, and media sessions.

In addition to providing user context to a context consumer, user context can be used to leverage additional context-dependent transaction authorization services. More specifically, user context may additionally be used to enhance an authorization procedure for certain transactions. There are many transactions, such as credit card charges, bank withdrawals, and delivery restaurant orders in which one party to the transaction may desire or need further authentication or notification before proceeding with the transaction.

Figure 6:
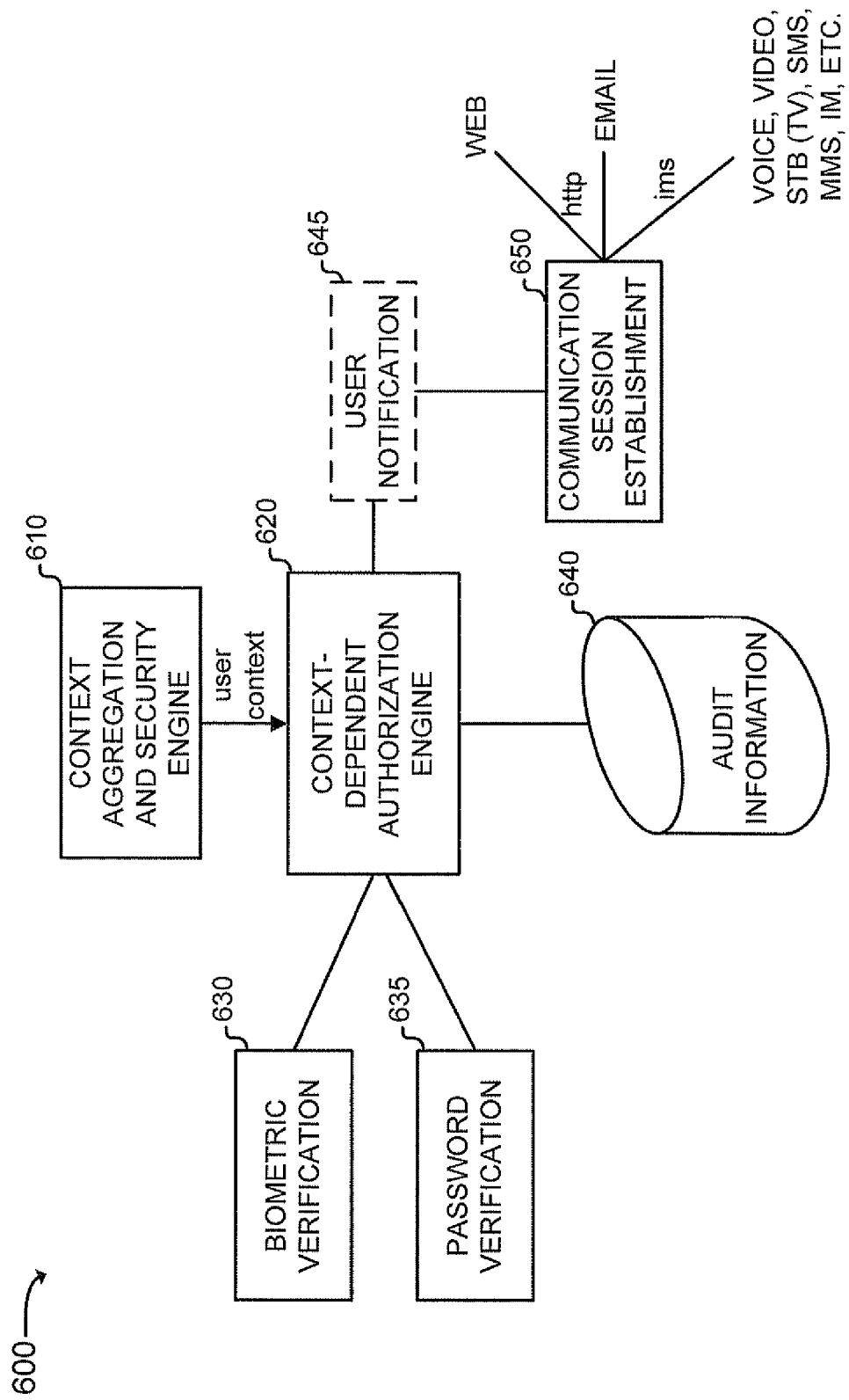
FIG. 6 is a diagram of an exemplary system for using context information to enhance transaction authorization.

FIG. 6 is a diagram of an exemplary system 600 for using context information to enhance transaction authorization. System 600 includes context aggregation and security engine 610 and context dependent authorization engine 620.

Context aggregation and security engine 610 may function equivalently to context aggregator 125, security and authentication engine 415, and security preferences storage 410, as shown in FIG. 4 and as previously discussed. In short, context aggregation and security engine 610 may generally function to aggregate and provide secure access to user context.

Context dependent authorization engine 620 may, based on user context, provide context-dependent authorization services to parties such as context consumers 120. A context-dependent authorization may be implemented using a number of different technologies or communication sessions. A number of exemplary functional elements that may be used in a context-dependent authorization are shown in FIG. 6, and, as shown, may include biometric verification 630, password verification 635, audit information 640, user notification 645, and communication session establishment 650.

Biometric verification 630 may include any combination of hardware or software used to provide biometric verification. Biometric verification may be based on biometric verification technologies such as voice verification, face recognition, eye (e.g., retinal or iris) recognition, or fingerprint recognition. Some biometric verification technologies, such as fingerprint recognition, may require specialized hardware. Whether a particular user, based on their current location, has access to such hardware may be stored and tracked as part of the user's context.

Password verification 635 may include any combination of hardware or software used to provide verification based on a user entered password and/or username. For password verification, a user will typically only need an audio or textual communication channel to context dependent authorization engine 620.

Audit information 640 may include information stored by context dependent authorization engine 620 that provides an audit trail relating to authorizations attempted for each user. In some implementations, audit information 640 may be viewable by users or by other parties.

When a transaction authorization is requested by a party, context dependent authorization engine 620 may contact the user from which authorization is requested. The communication channel used to contact the user and the type of response desired for the authorization may depend on the user's current context. Ideally, the chosen communication channel and authorization response should facilitate timely authorization attempts using the most secure network and device mechanism available, as determined by the user's context. For instance, context dependent authorization engine 620 may initiate a communication session with the user, shown as communication session establishment 650 in FIG. 6. Optionally, in some situations, context dependent authorization engine 620 may first notify the user that it is about to start a communication session, shown as user notification 645. Notification may be particularly relevant for voice, video or other disruptive communication sessions, where the notification may be performed via a more non-disruptive communication, such as a text message. A number of exemplary possible communication sessions are shown in FIG. 6, including a web based (i.e., HTTP or HTTPS session), email communication, and communication sessions delivered over IMS (Internet Protocol Multimedia Subsystem). The IMS communication sessions may particularly, include, for example, voice, video, set-top box (STB), short message service (SMS), multimedia messaging service (MMS), Instant Message (IM), etc.

Figure 7:
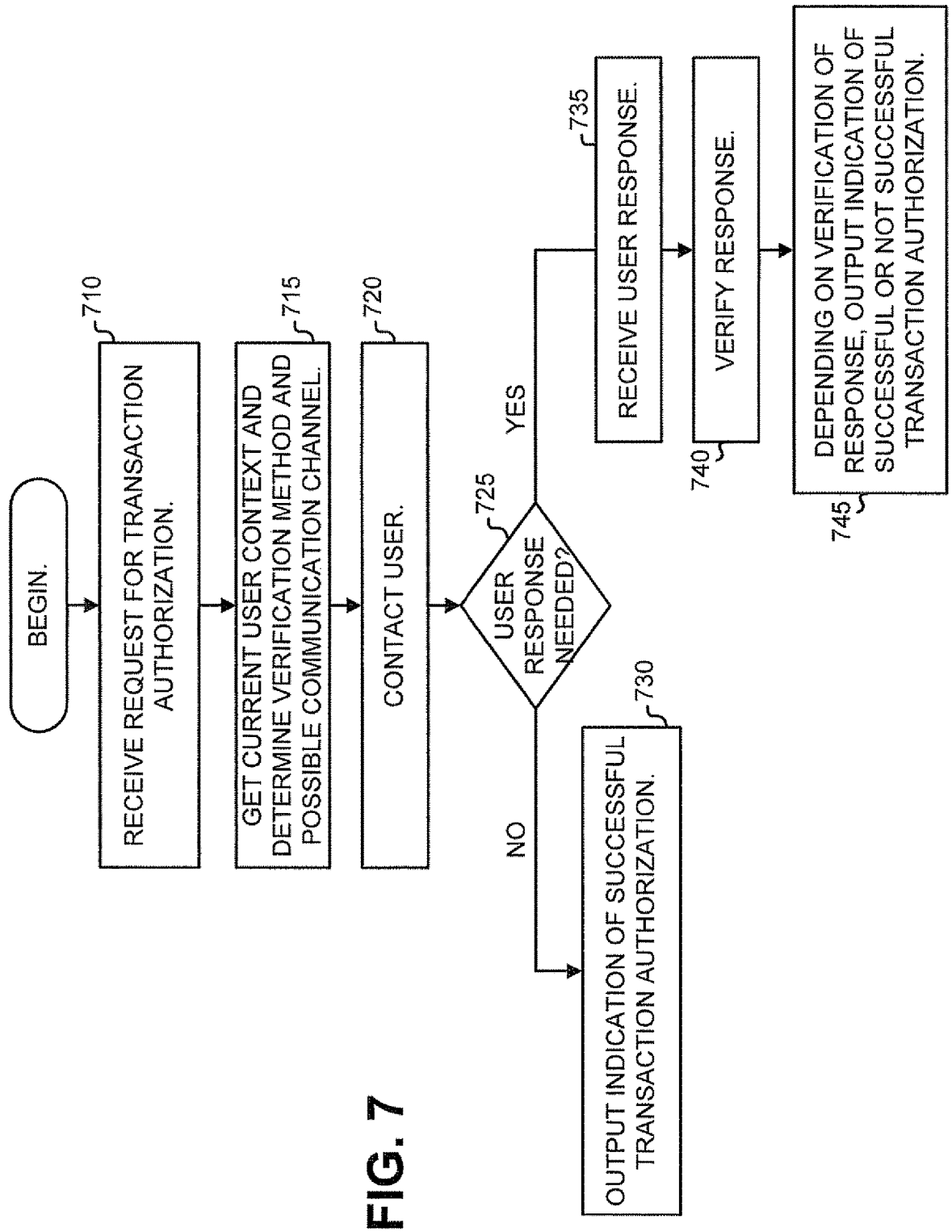
FIG. 7 is a flow chart illustrating exemplary operations for performing authorization services of a transaction based on a user's context.

FIG. 7 is a flow chart illustrating exemplary operations for performing authorization services of a transaction based on a user's context information. The operations shown in FIG. 7 may be performed using, for example, system 600.

To begin, an entity may request approval for a transaction from context-dependent authorization engine 620 (block 710). For example, the requesting entity may be a credit card company that has flagged a card transaction as having a high-risk of being a fraudulent transaction. Consequently, the credit card company may desire verification from the card holder. In some implementations, context-dependent authorization engine 620 may be owned or operated by the entity requesting approval for the transaction (e.g., the credit card company in this example). In other implementations, context-dependent authorization engine 620 may be operated as a service by, for example, the entity that operates context aggregation and security engine 610.

Context aggregation and security engine 610 may be queried to determine the current user context (block 715). Based on the user context and based on the type of transaction that is to be authorized, an appropriate transaction verification method and communication channel may be determined (block 715). For example, if the user's context indicates that the user only has access to text messaging and the transaction does not require a high level of security, the verification method may be determined as a text message from the user. For transactions requiring a greater level of security (e.g., confirmation of a large bank wire), context-dependent authorization engine 620 may determine that the user must verify the transaction with a biometric verification method. Based on the user's context, context-dependent authorization engine 620 may also determine which biometric verification methods are available to the user.

The user may be contacted to inform the user that verification for a transaction is requested (block 720). The communication channel used to contact the user may be determined from or based on the user's context.

If a further response from the user is not needed, simply contacting the user or transmitting a message to the user may be enough, and the verification may output a successful result (blocks 725 and 730). In some situations, such as low or medium security applications, it may not be necessary to explicitly receive a user response. For example, a credit card company may provide an option to confirm all card transactions by, depending on the user's context, an email message, a text message, an automated voice message, or a message broadcast to the user's set-top box. In other applications, a user response may be desired. However, if no response is received in a certain time period, such as one hour, the transaction may be approved regardless.

If a user response is required, (block 725—YES), context-dependent authorization engine 620 may receive the response. The verification method embodied by the response may vary based on the user's context and the requirements of the transaction authorization. For example, if the transaction is one in which a high level of security is desired, such as a bank account transfer, a higher level of user verification may be required. If the transaction requires a high level of user verification and the user's context indicates that user has access to a telephone, context aggregator 125 may call the user and perform biometric voice verification to authorize the transaction. Alternatively, depending on the user's context and the transaction that is being verified, other forms of biometric verification (e.g., eye scan, fingerprint, etc.) may be used.

Context-dependent authorization engine 620 may verify the response (block 740), such as by verifying that a password submitted by the user is correct or verifying that the user's voice matches the user's known voice according to a biometric voice verification technique. If the verification is determined to be successful, an indication of the successful transaction authorization may be output by context-dependent authorization engine (block 745).

To further illustrate context-dependent transaction authorization, as applied by context-dependent authorization engine 620, a number of examples of transaction authorizations will now be given.

Context-dependent transaction authorization may be used to control physical access to a facility. Consider the situation of an employee that arrives at a company facility during non-business hours and requests access from the local security staff. Since this is against company policy, the security staff may initiate an authorization request to the employee's manager. Assume that the manager's context is "at dinner with family." Based on this context, an email may be sent to the manager's Blackberry device and the manager may reply that the employee should be allowed inside.

As another example, consider the situation in which identify thieves request a copy of an unsuspecting consumer's credit history. Assume that the request is made while the consumer's context indicates "unavailable." A notification email may be sent to the consumer's email account and a notification voice message may be left on the consumer's voice mail. Once the consumer hears the voice mail, the consumer may deny the authorization.

As another example, consider ordering pizza from a pizza delivery restaurant. The user may send a message to his preferred restaurant to order "the usual." The restaurant may then request that context-dependent authorization engine 620 send a confirmation message that confirms the delivery address (which may be selected based on user context). The confirmation message may be sent to a device of the user that is determined based on the user context. Alternatively, the confirmation message may require a response in which the user authorizes the pizza delivery person to come to the user's location.

As another example, consider the use of context in the area of personal entertainment and social networking. A parent may have a teenage daughter that has a "friends" list at a social networking web site. The web site may allow users to enable context-dependent authorization when authorizing new names to a "friends" list. Assume that the parent is at home watching television with her daughter when someone tries to add themselves to the daughter's "friends" list. The parent's context, which may be "watching television," may then be used to determine that an authorization message should be sent to the television's set-top box. The parent, after speaking with her daughter, can then decide to accept or reject the addition to the daughter's "friends" list.

As another example, consider the use of context in the area of personal entertainment authorization. A television service subscriber may have access to video on demand (VOD) services through the television provider. The subscriber may authorize VOD services, without limitation, as long as the rating of the television show is below or equal to a certain rating (e.g., PG-13). Beyond this rating, however, the subscriber may wish that an authorization request be issued before the service is allowed to start. Accordingly, a request for content rated above PG-13 may trigger an authorization message that is dynamically routed to the appropriate device, based on the subscriber's context. In this manner, parents can be sure their children do not watch inappropriate content.

Context information may be particularly used to deliver or enhance the delivery of advertisements to a user.

Figure 8:
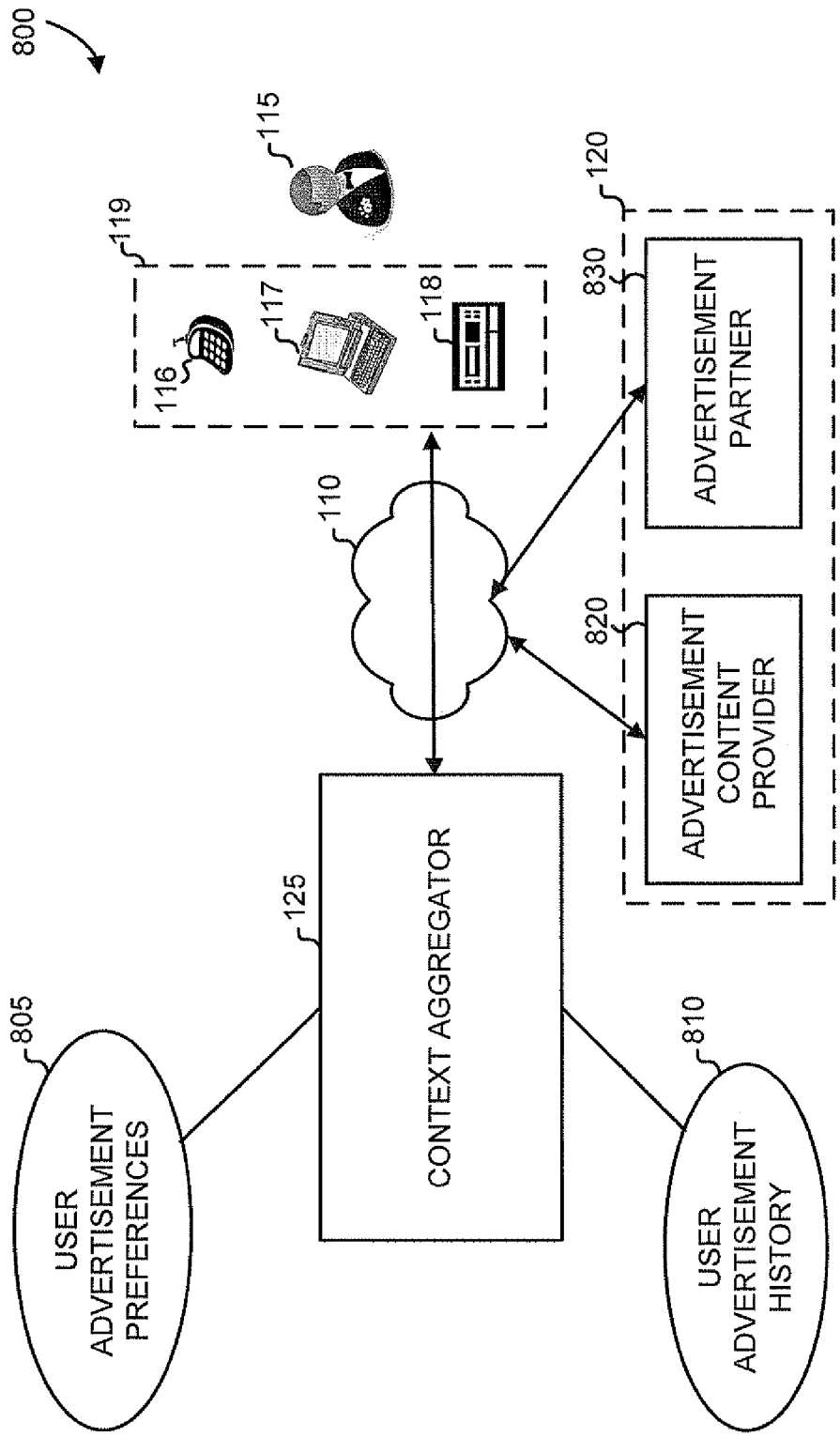
FIG. 8 is a diagram illustrating an exemplary system for providing advertisements to a user.

FIG. 8 is a diagram illustrating an exemplary system 800 for providing advertisements to a user (i.e., a user of devices 119). As shown, system 800 may include a context aggregator 125, a context consumer 120, a user device(s) 119, and a user 115. Context consumer 120 may represent entities that use context information to provide advertisements to user 115. As particularly shown in FIG. 8, context consumer 120 may include advertisement content provider 820 and advertisement partner 830. Further, as is shown in FIG. 8, context aggregator 125 may store context information relating to advertisements, shown as user advertisement preferences 805 and user advertisement history 810.

User advertisement preferences 805 include information relating to advertisement preferences of a user. User advertisement preferences 805 may be implemented as, for example, a database or other storage device. In some implementations, the functionality associated with user advertisement preferences 805 may be integrated within context aggregator 125. User advertisement preferences may include any preferences that may be relevant to the display of advertisements to the user. For example, the user preferences stored by user advertisement preferences 805 may include topics, hobbies, or categories of information in which the user is interested. This information may be explicitly provided by the user (e.g., via a questionnaire in which the user selects topics of interest) or implicitly inferred based on analysis of the activities of the user, documents generated by the user, or other context information of the user. User advertisement preferences 805 may also include advertisement opt-in/opt-out decisions made by the user. The user preferences may additionally include information relating to on which of devices 119 the user would like to, or would prefer to, receive information, and how the advertisements are to be delivered to the user on a particular device 119 (e.g., the user may prefer a video stream when using personal computer 117 or set-top box 118, and email or SMS instant messaging when using mobile phone 116).

User advertisement history 810 may store information relating to advertisement history information for a user. User advertisement history 810 may be implemented as, for example, a database or other storage device. In some implementations, the functionality of user advertisement history 810 may be integrated within context aggregator 125. User advertisement history information may include, for example, a listing of which advertisements have been previously shown to the user and the user's reactions (to the extent known). In general, user advertisement history 810 may be used to maintain a user's advertisement history over multiple channels (i.e., different devices 119) for subsequent advertisement targeting based on, for example, which advertisements have had the best selection rate, or the effectiveness of various advertisements when delivered over different channels, etc.

Context aggregator 125 may be accessed by context consumer 120 (i.e., advertisement partner 830 and/or advertisement content provider 820) in order to provide personalized advertisements based on user's context.

Advertisement content provider 820 may include one or more computing devices that operate to provide advertisements to users. As will be described in more detail below, advertisement content provider 820 may provide the advertisements based on communication with context aggregator 125.

Advertisement partner 830 may represent partners, such as third party advertisement partners, that may provide advertisement related services to advertisement content provider 820 and/or context aggregator 125. Advertisement partner 830 may, for instance, provide analysis services relating to advertisements delivered to the user. For instance, advertisement partner 830 may communicate with context aggregator 125 to obtain and analyze user advertisement preferences, user advertisement history, other context information (such as that shown in FIG. 3), and based on the analysis of this information, may provide business rules or logic to advertisement content provider 820 to assist advertisement content provider 820 in providing an optimal set of advertisements to the user.

Although advertisement content provider 820 and advertisement partner 830 are shown in FIG. 8 as two distinct entities, it can be appreciated that in some implementations, advertisement content provider 820 and advertisement partner 830 may be implemented as a single entity. Further, in some implementations, advertisement content provider 820 and advertisement partner 830 may be integrated as a part of context aggregator 125. In this situation, context aggregator 125 may itself deliver advertisements to users.

Figure 9:
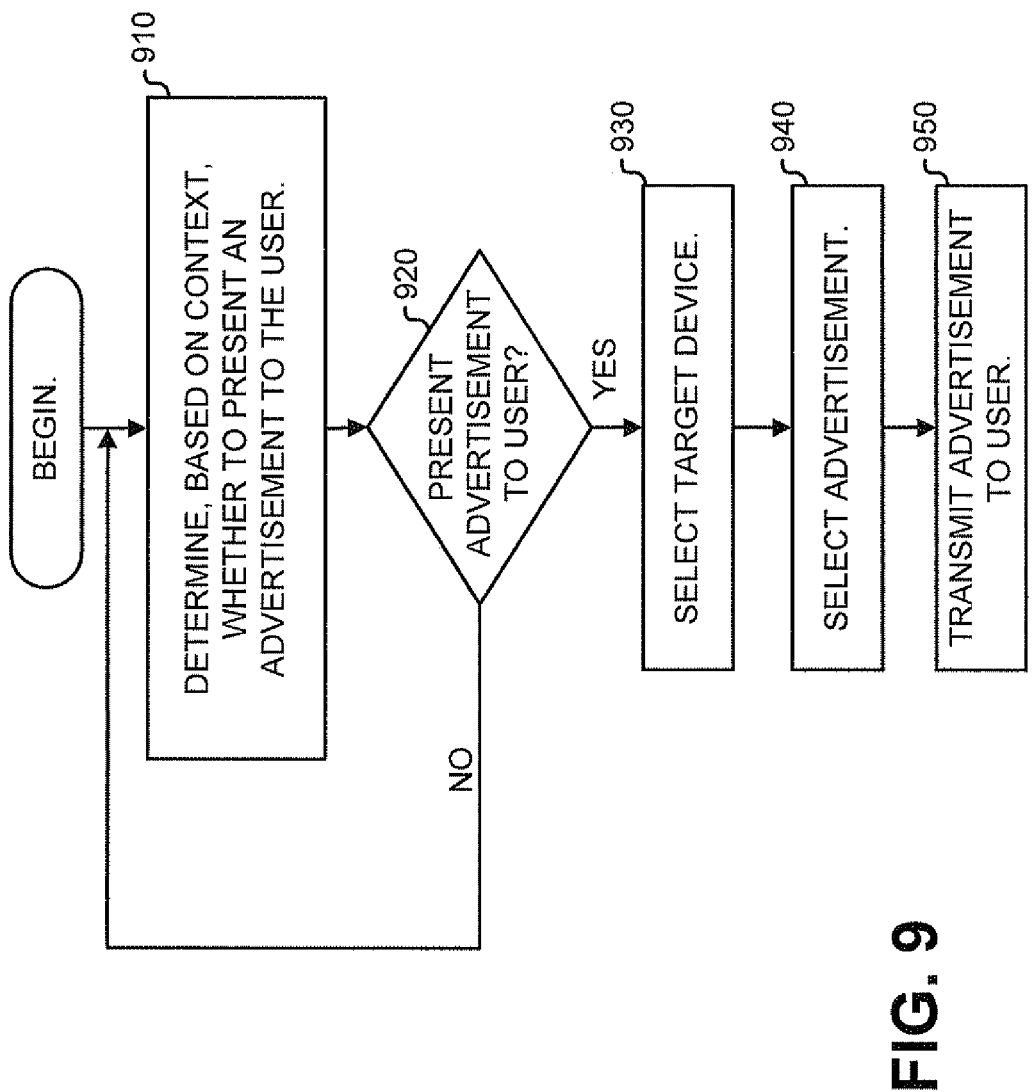
FIG. 9 is a flow chart illustrating exemplary operations for providing advertisements to a user.

FIG. 9 is a flow chart illustrating exemplary operations for providing advertisements to user 115.

Context consumer 120, such as advertisement content provider 820, may determine whether to present an advertisement to the user based on the user's context (block 910). Advertisement content provider 820 may, for instance, receive or monitor, through context aggregator 125, the user's context and present advertisements to the user based on the context. For example, advertisement content provider 820 may present advertisements at certain times, in response to the user's location, in response to the user interacting with a certain one of devices 119, in response to recent activities by the user, or in response to user generated status information. Further, user advertisement preferences 805 and/or user advertisement history 810 may be used to determine whether to present an advertisement to the user.

When an advertisement is determined for presentation to the user (block 920—YES), advertisement content provider 820 may select the target device to which the advertisement is to be presented (block 930). The device may be selected based on the user's context information. For instance, advertisement content provider 820 may select a device for which the device presence information indicates the device is on and available to receive information. For a mobile phone, the mobile phone may need to be turned on and the user's status set to a state that indicates that the user is free to receive information. For a set-top box, the set-top may need to be turned on and a status of the set-top box set to indicate that the user is viewing programming for which it is appropriate to present an advertisement. For instance, for set-top box 118, advertisements may only be sent to the set-top box when the user is viewing the television guide with set-top box 118 or when set-top box 118 is initially turned on.

Advertisement content provider 820 may also select the advertisement that is to be presented (block 940). The advertisement may be selected based on a number of portions of the user's context information. For example, user advertisement preferences 805, user advertisement history 810, general preferences 305, and device capabilities 330 may be used to select an appropriate advertisement. Different advertisements may be suited for different devices. For instance, an advertisement that is implemented as a high definition video stream may only be appropriate when a user is viewing television through set-top box 118. Conversely, an audio only advertisement may be most appropriate when the user is using personal computer 117 and a text message advertisement may be most appropriate when the user is using mobile phone 116.

Advertising content provider 820 may next transmit the selected advertisement to the selected device (block 950).

To further illustrate applications of the operations illustrated in FIG. 9, a number of examples of the use of user context to select and present advertisements will now be given.

Consider the situation in which a user has registered to receive advertisements through their mobile phone 116 or set-top box 118. The user may receive the advertisements, for example, as part of a reduced price telecommunications plan in which the advertisements are used to subsidize the reduced price point for the plan. The user's advertisement preferences 805 may include topics in which the user is particularly interested and user demographic information. Advertising content provider 820 may leverage the user's current context to provide personalized advertisement delivery. For example, advertisements may be provided to the user that match the user's areas of interest. Additional context information may be used to further target the type or timing of the advertisements. For example, user generated status information 310 or labeled location information 315 may be used to time the delivery of the advertisements. For example, if the user's status is "work" advertisements relating to the user's work environment may be provided. Device capabilities 330 may also be used to further tailor the advertisements. For example, video-based advertisements may only be sent to the user's mobile phone if the mobile phone is capable of receiving video. Device presence information 305 may also be used to control when advertisements are delivered. For example, set-top box 118 may signal content aggregator 125 when it is initially turned on. The initial turn-on of set-top box 118 may be used to trigger display of an advertisement by set-top box 118.

As another example of using context to select and present advertisements, consider the situation in which context aggregator 125 tracks presence information for a particular user that uses mobile phone 116, personal computer 117, and set-top box 118. Assume that user advertisement preferences 805 includes user preferences that were explicitly entered by the user. For example, the user may have selected a number of categories, such as categories relating to topics or subjects, in which the user is interested. User advertisement preferences 805 may also include preference information automatically derived from user content. For example, content aggregator 125 may scan user documents, email, or other user generated content to determine categories/topics in which the user is interested. User advertisement history 810 may contain a history of the previous advertisements presented to the user. The history may describe which advertisements were presented to the user, when the advertisements were presented to the user, and, if applicable for the type of advertisement, whether the user was interested in or responded to the advertisement. Advertisement content provider 820 may select advertisements to present to the user based on the topics/subjects selected by the user, the categories determined from scanning the user documents or emails, and/or the user advertisement history. For example, an advertisement may be presented to the user for a particular product if the advertisement has not previously been presented to the user and the product relates to the topics/subjects that were either selected by the user or determined to be relevant to the user from scanning the user documents or emails.

Presence information of devices 119 being used by the user may also be used to select advertisements. For instance, if the user is currently using mobile phone 116, advertisements appropriate for the technical capabilities of the phone may be selected, such as an advertisement communicated via email, SMS instant messaging, or audio.

Figure 10:
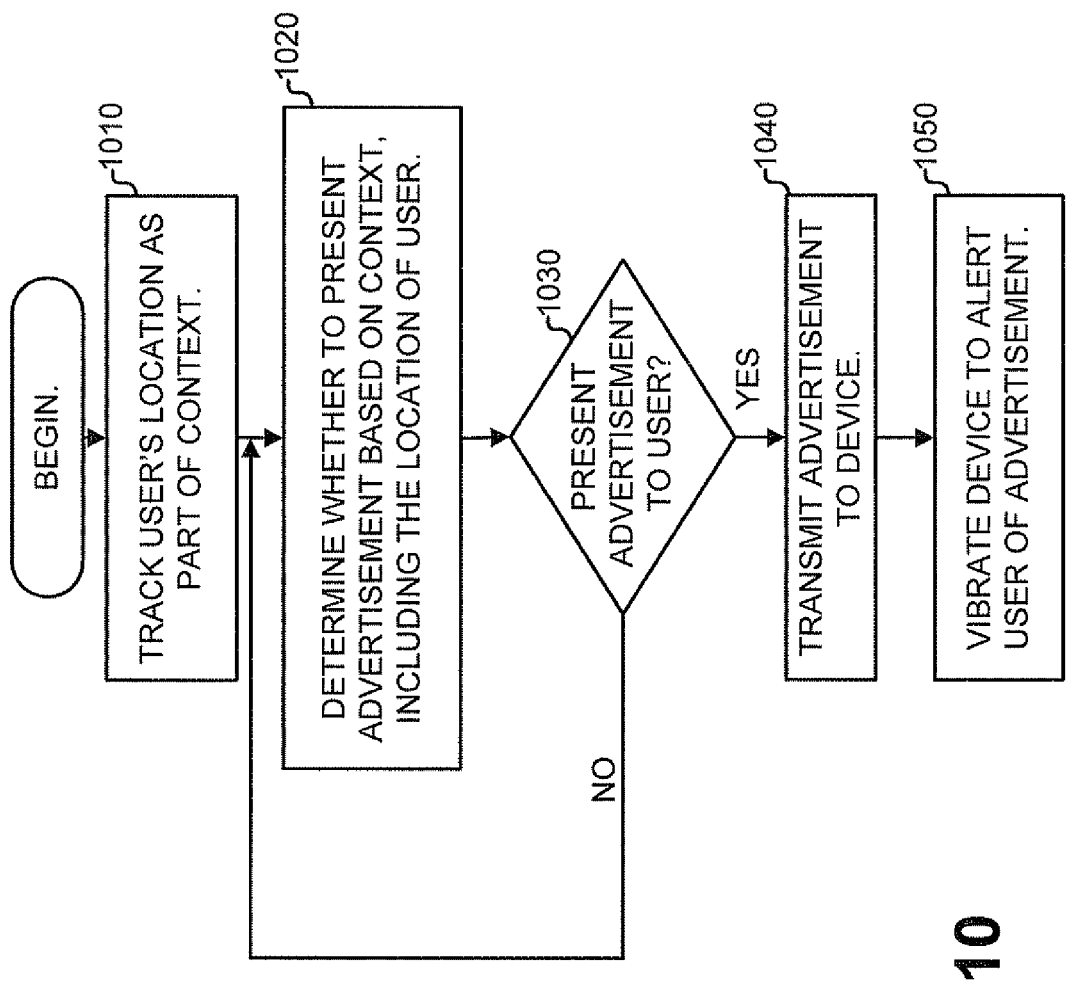
FIG. 10 is a flow chart illustrating exemplary operations for providing advertisements to a user based on the user's location.

FIG. 10 is a flow chart illustrating exemplary operations for providing advertisements to user 115 based on the user's location.

As previously mentioned, context aggregator 125 may store the physical location of the user, such as, for a mobile phone 116, the location of the phone as determined by a GPS unit included in the phone. Context aggregator 125 may thus track the user's location as part of the context (block 1010). Advertisement content provider 820 may access the user's context to determine whether to present an advertisement to the user. This determination of whether to present the advertisement may be based on user's context, including the location of the user (block 1020). In one implementation, the advertisements may be for products or services that are geographically near the user's current location. For instance, merchants may send advertisements that include time limited offers when the user is in the vicinity of the merchant.

When an advertisement is determined to be presented to the user (block 1030—YES), advertisement content provider 820 may then transmit the advertisement to device 119 (block 1040). In one implementation, device 119 may particularly be a mobile phone or other portable device that the user is likely to carry.

The advertisement, when received by device 119, may be configured to cause device 119 to vibrate to alert the user of the advertisement (block 1050). Alternatively, device 119 may emit a sound (e.g., a beep) or perform another action (e.g., a visual indicator) to alert the user that an advertisement has arrived.

Figure 11:
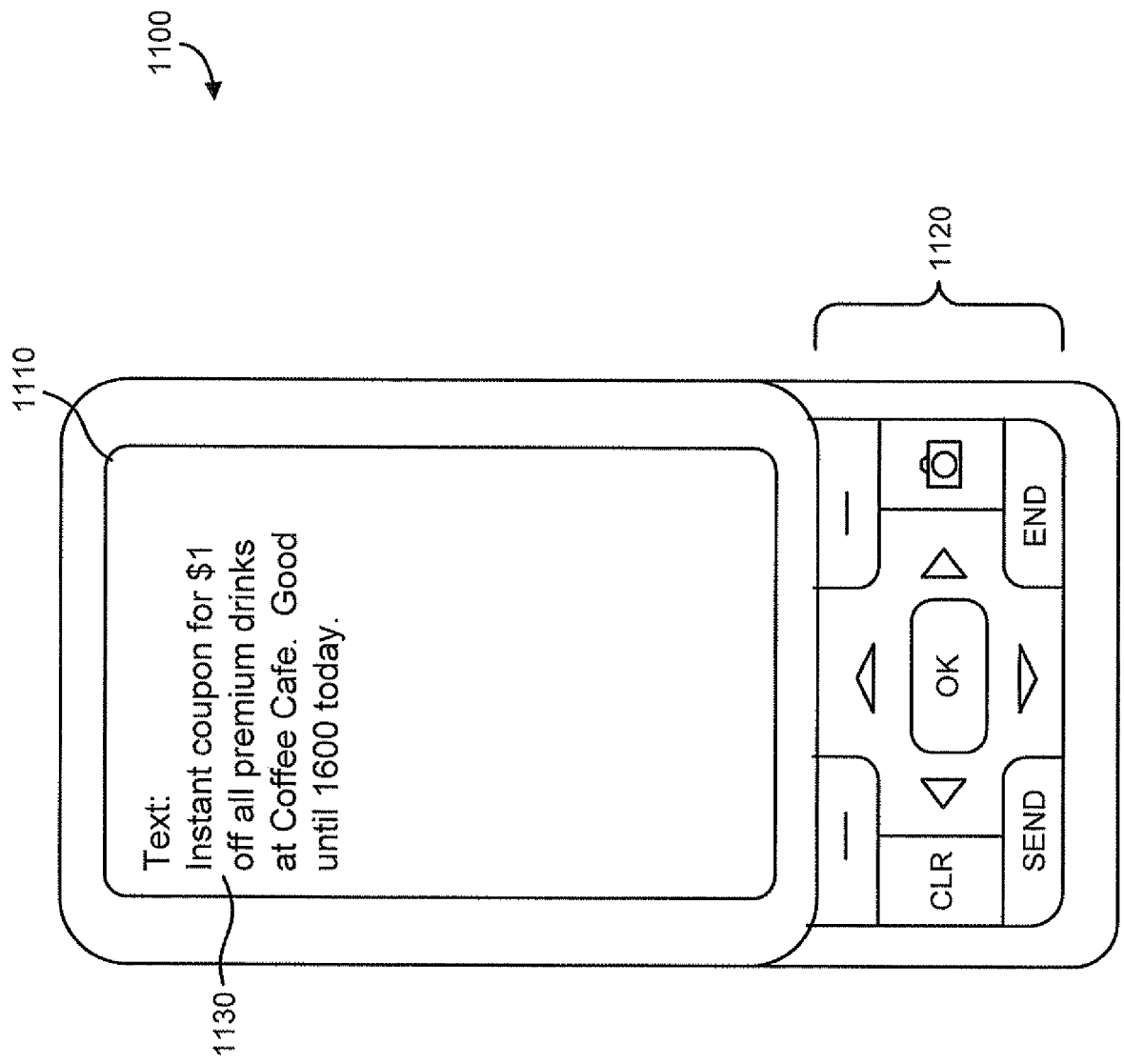
FIG. 11 is a diagram illustrating an exemplary implementation of a mobile phone displaying an advertisement.

FIG. 11 is a diagram illustrating an exemplary implementation of a mobile phone displaying an advertisement. Mobile phone 1100 may include a display 1110 and a control keypad 1120. An exemplary advertisement 1130 is illustrated in display 1110. In this example, advertisement 1130 may be an advertisement delivered as an SMS text message. The advertisement is an advertisement offering $1 off of "premium drinks" at the company "Coffee Cafe." Advertisement 1130 may be delivered to the user when the user is within a certain distance, such as 1 mile, of the merchant. Additionally, as shown in advertisement 1130, the promotion for a $1 off premium drinks expires later in the day in which advertisement 1130 is sent. To redeem the coupon, the user may simply show the merchant the advertisement when purchasing a beverage.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of acts have been described above with respect to FIGS. 5, 7, 9 and 10 the order of the acts may differ in other implementations consistent with principles of the invention. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments consistent with the principles of the invention is not limiting of the invention. Thus, the operation and behavior of the preferred embodiments of the invention were described without reference to the specific software code—it being understood that software and control hardware may be designed to implement the embodiments based on the description herein.

Further, certain portions of the invention may be implemented as "logic" that performs one or more functions. This logic may include hardware or a combination of hardware and software, such as an application specific integrated circuit, a field programmable gate array, a processor, or a microprocessor.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server device, context information relating to a user,
      the context information including:
         device presence information that is automatically generated by a plurality of communication devices associated with the user,
         information associated with one or more preferences relating to the plurality of communication devices, and
         information identifying a respective content delivery preference associated with each of the plurality of communication devices;
   selecting, by the server device, based on the device presence information, and based on the information associated with the one or more preferences, a first communication device of the plurality of communication devices;
   transmitting, by the server device, content to the first communication device for presentation to the user;
   identifying, by the server device, an update to the context information;
   determining, by the server device, that a second communication device of the plurality of communication devices is available based on the update to the context information; and
   switching, by the server device, transmission of the content from the first communication device to the second communication device for presentation to the user based on determining that the second communication device is available.

2. The method of claim 1, wherein the device presence information includes information identifying an on/off state of each communication device of the plurality of communication devices; and
   wherein determining that the second communication device is available comprises:
      determining that the second communication device is available based on the update to the context information indicating that the on/off state of the second communication device changed.

3. The method of claim 1, wherein the device presence information includes information identifying a geographic location of each communication device of the plurality of communication devices; and
   wherein determining that the second communication device is available comprises:

determining that the second communication device is available based on the update to the context information indicating that the geographic location of the second communication device changed.

4. The method of claim 1, wherein the device presence information includes information identifying a geographic location of the first communication device; and
wherein selecting the first communication device comprises:
selecting the first communication device based on the geographic location indicating that the first communication device is within a threshold distance from an entity associated with the content.

5. The method of claim 1, wherein the device presence information includes information identifying one or more preferences associated with the user; and
wherein selecting the first communication device comprises:
selecting the first communication device based on the information identifying the one or more preferences associated with the user.

6. The method of claim 1, further comprising:
determining, based on the update to the context information, that the second communication device is, for the content, a preferred device; and
wherein switching the transmission comprises:
switching the transmission based on the second communication device being, for the content, the preferred device.

7. The method of claim 1, wherein:
the content comprises an advertisement for a product or a service associated with a merchant, and
the device presence information includes information indicating the user has a preference associated with the product or the service; and
selecting the first communication device comprises:
selecting the first communication device based on the information indicating the user has the preference associated with the product or the service.

8. The method of claim 1, wherein the content is optimized for the highest resolution communication device available.

9. A device, comprising:
one or more memories; and
one or more processors communicatively coupled to the one or more memories, configured to:
receive context information relating to a user,
the context information including:
device presence information that is automatically generated by a plurality of communication devices associated with the user,
information associated with one or more preferences relating to the plurality of communication devices, and
information identifying a respective content delivery preference associated with each of the plurality of communication devices;
select, based on the device presence information, and based on the information associated with the one or more preferences, a first communication device of the plurality of communication devices;
transmit content to the first communication device for presentation to the user;
identify an update to the context information;
determine that a second communication device of the plurality of communication devices is available based on the update to the context information; and
switch transmission of the content from the first communication device to the second communication device for presentation to the user based on determining that the second communication device is available.

10. The device of claim 9, wherein the device presence information includes information identifying an on/off state of each communication device of the plurality of communication devices; and
wherein the one or more processors, when determining that the second communication device is available, are configured to:
determine that the second communication device is available based on the update to the context information indicating that the on/off state of the second communication device changed.

11. The device of claim 9, wherein the device presence information includes information identifying a geographic location of each communication device of the plurality of communication devices; and
wherein the one or more processors, when determining that the second communication device is available, are configured to:
determine that the second communication device is available based on the update to the context information indicating that the geographic location of the second communication device changed.

12. The device of claim 9, wherein the device presence information includes information identifying a geographic location of the first communication device; and
wherein the one or more processors, when selecting the first communication device, are configured to:
select the first communication device based on the geographic location indicating that the first communication device is within a threshold distance from an entity associated with the content.

13. The device of claim 9, wherein the device presence information includes information identifying one or more preferences associated with the user; and
wherein the one or more processors, when selecting the first communication device, are configured to:
select the first communication device based on the information identifying the one or more preferences associated with the user.

14. The device of claim 9, wherein the one or more processors are further configured to:
determine, based on the update to the context information, that the second communication device is, for the content, a preferred device; and
wherein the one or more processors, when switching the transmission, are configured to:
switch the transmission based on the second communication device being, for the content, the preferred device.

15. The device of claim 9, wherein:
the content comprises an advertisement for a product or a service associated with a merchant, and
the device presence information includes information indicating the user has a preference associated with the product or the service; and
wherein the one or more processors, when selecting the first communication device, are configured to:
select the first communication device based on the information indicating the user has the preference associated with the product or the service.

16. A non-transitory computer-readable medium storing instructions, the instructions comprising:

one or more instructions that, when executed by one or more processors, cause the one or more processors to:
receive context information relating to a user,
the context information including:
device presence information that is automatically generated by a plurality of communication devices associated with the user,
information associated with one or more preferences relating to the plurality of communication devices, and
information identifying a respective content delivery preference associated with each of the plurality of communication devices;
select, based on the device presence information, and based on the information associated with the one or more preferences, a first communication device of the plurality of communication devices;
transmit content to the first communication device for presentation to the user;
identify an update to the context information;
determine that a second communication device of the plurality of communication devices is available based on the update to the context information; and
switch transmission of the content from the first communication device to the second communication device for presentation to the user based on determining that the second communication device is available.

17. The non-transitory computer-readable medium of claim 16, wherein the device presence information includes information identifying an on/off state of each communication device of the plurality of communication devices; and
wherein the one or more instructions, that cause the one or more processors to determine that the second communication device is available, cause the one or more processors to:
determine that the second communication device is available based on the update to the context information indicating that the on/off state of the second communication device changed.

18. The non-transitory computer-readable medium of claim 16, wherein the device presence information includes information identifying a geographic location of each communication device of the plurality of communication devices; and
wherein the one or more instructions, that cause the one or more processors to determine that the second communication device is available, cause the one or more processors to:
determine that the second communication device is available based on the update to the context information indicating that the geographic location of the second communication device changed.

19. The non-transitory computer-readable medium of claim 16, wherein the device presence information includes information identifying a geographic location of the first communication device; and
wherein the one or more instructions, that cause the one or more processors to select the first communication device, cause the one or more processors to:
select the first communication device based on the geographic location indicating that the first communication device is within a threshold distance from an entity associated with the content.

20. The non-transitory computer-readable medium of claim 16, wherein the one or more instructions, when executed by the one or more processors, further cause the one or more processors to:
determine, based on the update to the context information, that the second communication device is, for the content, a preferred device; and
wherein the one or more instructions, that cause the one or more processors to switch the transmission, cause the one or more processors to:
switch the transmission based on the second communication device being, for the content, the preferred device.

* * * * *